April 12, 1932.  A. F. SPITZGLASS  1,853,469
PYROMETER CONTROL
Filed May 5, 1928  5 Sheets-Sheet 2
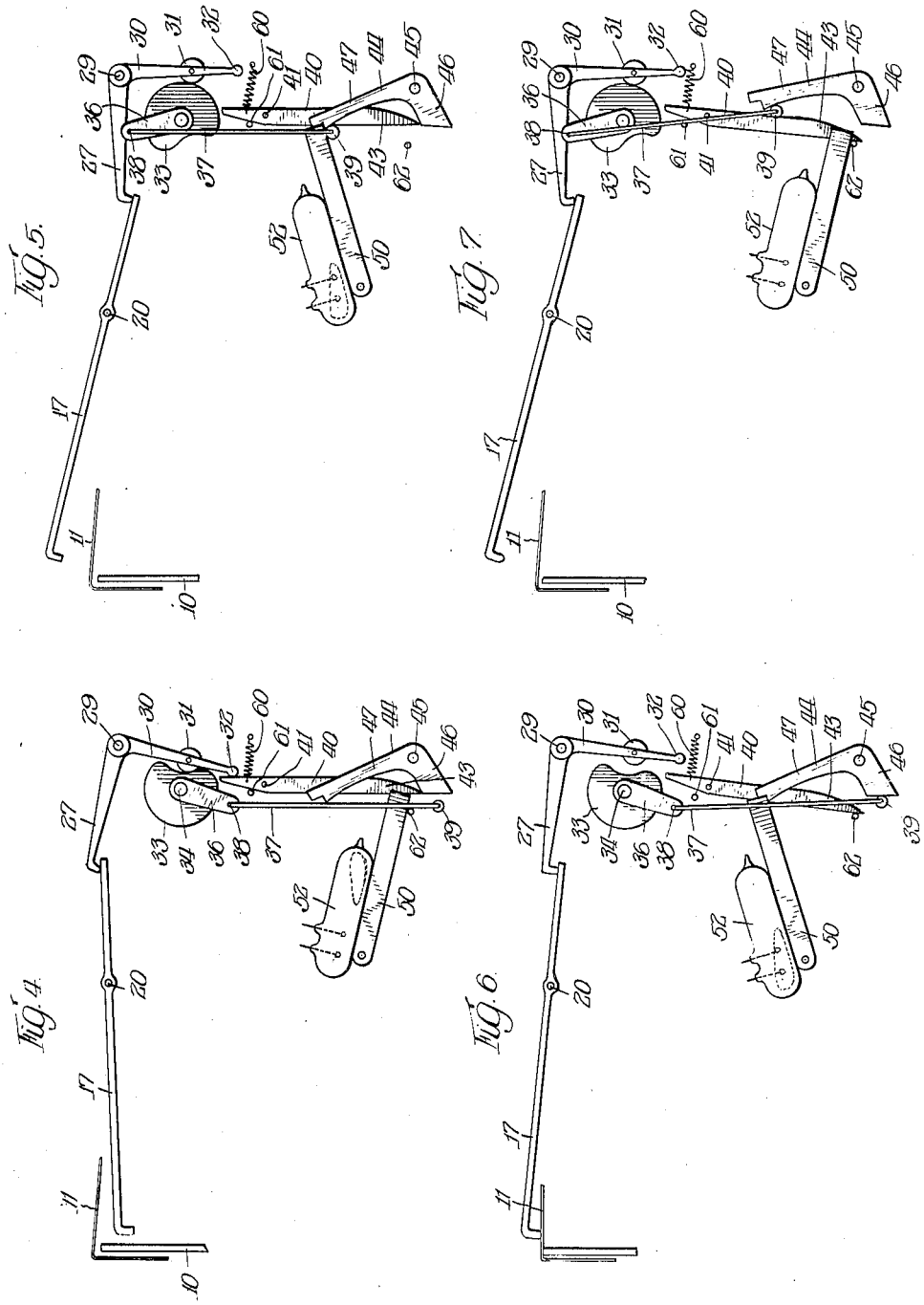

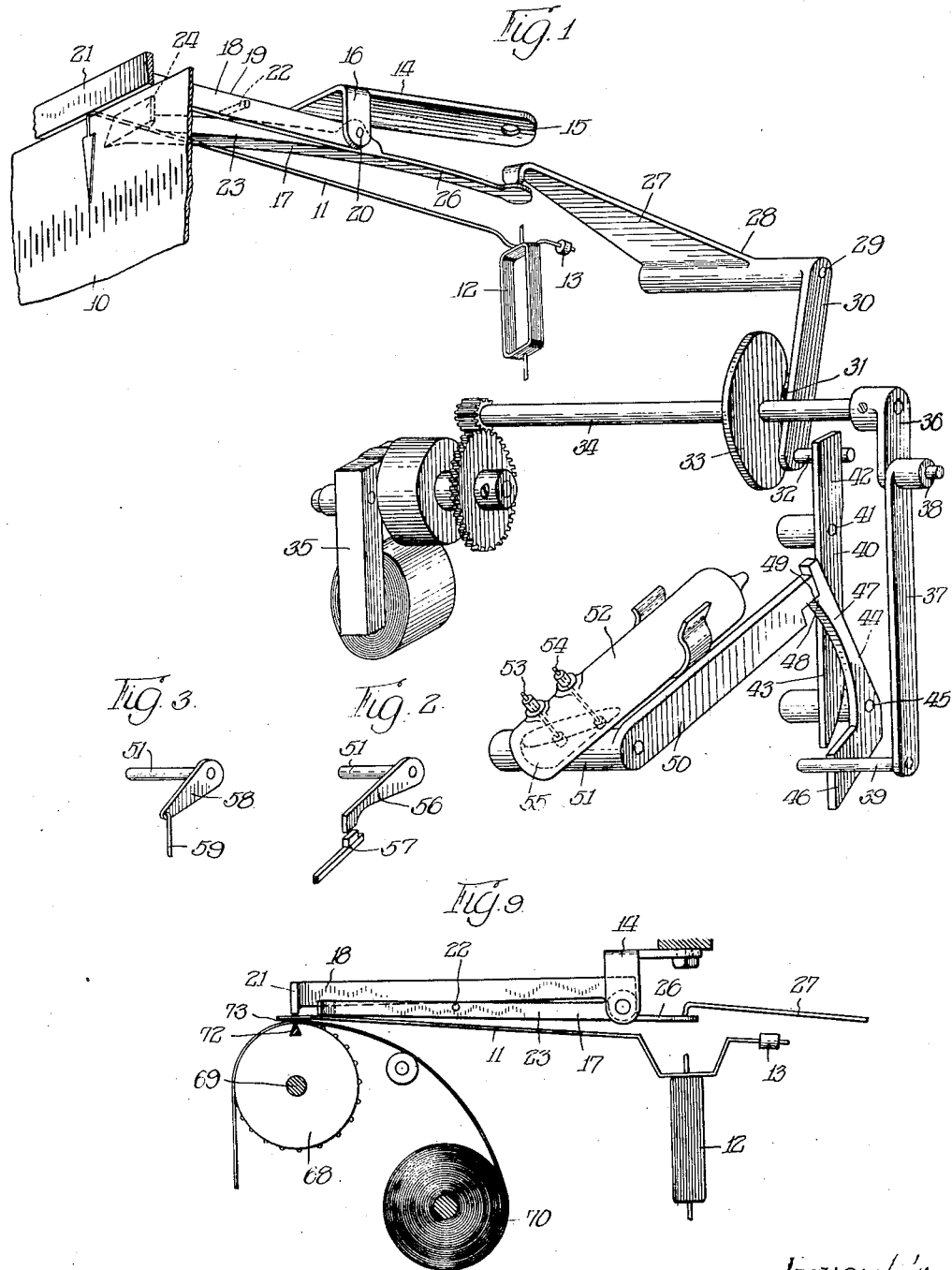

April 12, 1932.  A. F. SPITZGLASS  1,853,469
PYROMETER CONTROL
Filed May 5, 1928  5 Sheets-Sheet 3

Inventor:
Albert F. Spitzglass
By Atkinson, Huxley, Byron & Knight
Attys

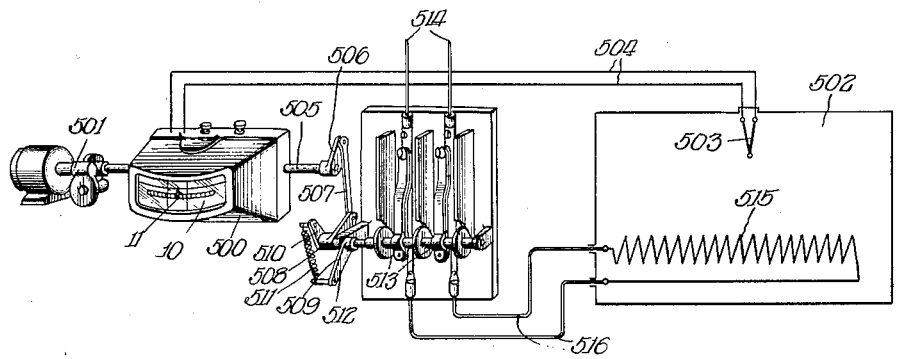
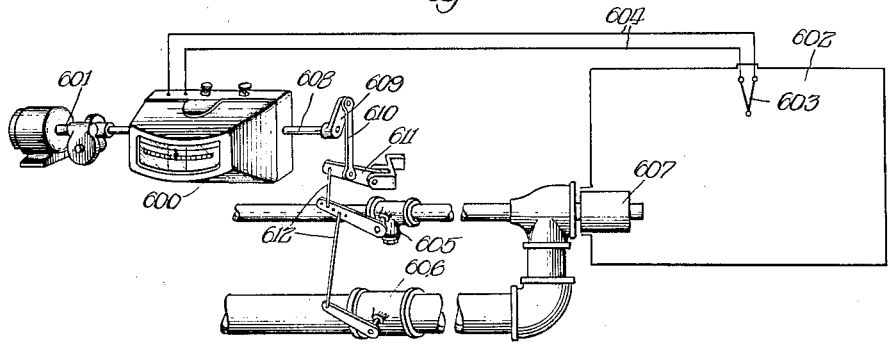
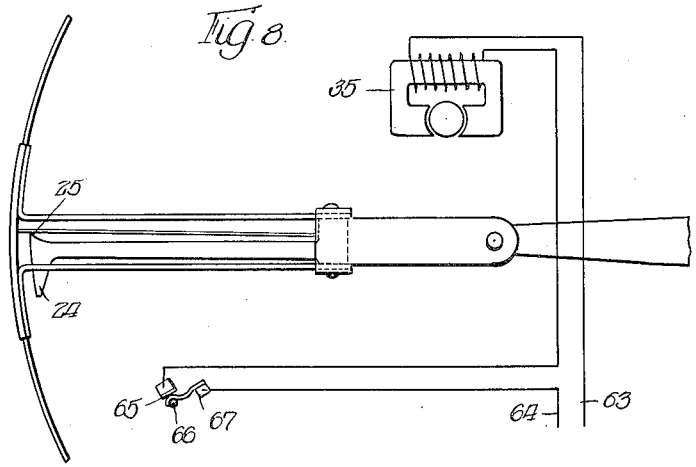

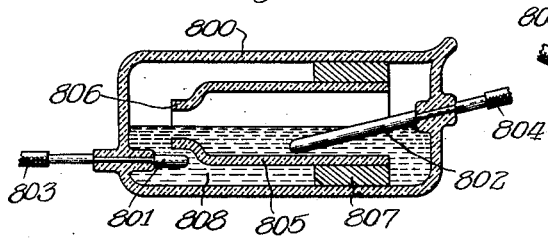
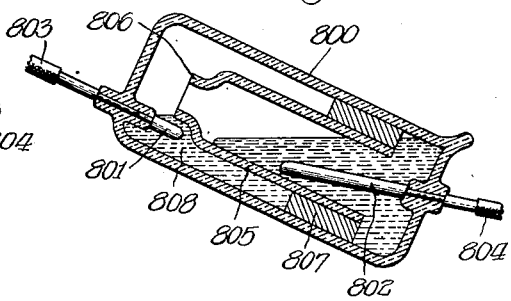
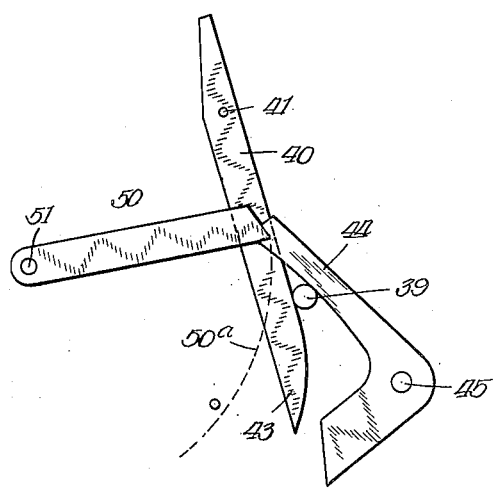
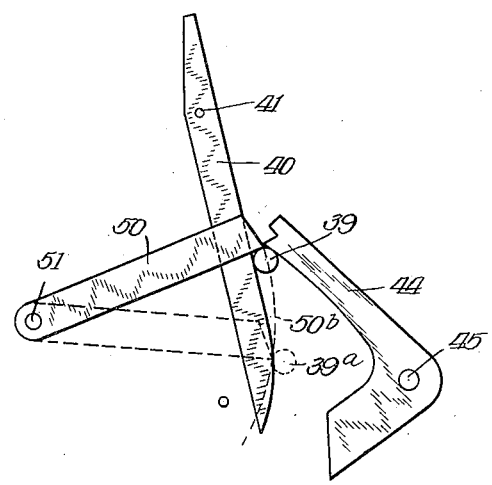
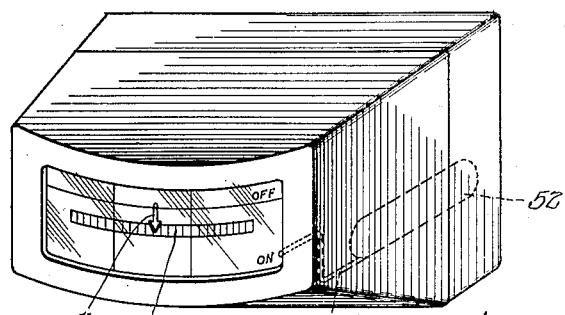

Patented Apr. 12, 1932

1,853,469

UNITED STATES PATENT OFFICE

ALBERT F. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS

PYROMETER CONTROL

Application filed May 5, 1928. Serial No. 275,398.

This invention pertains to recording instruments, and more particularly to pyrometers adapted to control of heating units or the like.

It is well known that there are various devices adapted for temperature, heat or other conditions control in large furnaces, heating plants and the like, but such devices are usually very complicated due to the power necessary for operating mechanism incident to control such conditions. One form of such heat control device is the pyrometer, and in the pyrometer as well as in other control, it is of course desirable where possible to have a direct operation from the device itself, but it has not been practical before to commercially utilize direct operation from a pyrometer due to the large currents necessary to be handled, as there is arcing, especially in breaking contacts to shut off the current flowing to the heating plant, which arcing rapidly destroys the points of the switch control; or where there is valve, switch or the like operation necessary, not enough power can be developed for sensitive work.

In order to adapt the pyrometer for heavy duty work, it must be made to fulfill two requirements; namely, continuous operation (on outgoing effect) and the power to operate the switch. There are some pyrometers on the market, the operation of which is continuous; that is, for instance, when the switch control is closed, it remains closed until it is reversed. The difficulty, however, with this form of pyrometer is that operation is directly off the pointer or index, and as the system is necessarily very delicate, such pyrometer does not have the power to operate heavy apparatus. Again, there are pyrometers on the market whose operation is such that it is possible to get considerable power out of the control, but at the expense of continuous operation, and, therefore, the switch once closed remains closed for only a very short period. On this account it is necessary to compensate for this movement by the use of a special type of relay which will operate in the short period of time and keep the switch closed until the conditions are reversed. This is objectionable in that the complete device for the heat control is very complicated.

It is then desirable to obtain a device which is an improvement over one employing mere continuous operation and one which is powerful enough though operated from a sensitive pointer, and also to obtain a device which will be a combination of these features; that is, will operate from a very sensitive movement, yet at the same time will give great power, in fact, power as great as desired, without affecting the sensitivity, and at the same time, the arrangement to be such that the effect of this power may be continuous on whatever mechanism it is desired to operate.

It is therefore an object of this invention to provide a control of the millivoltmeter, galvanometer or the like device type for recording or indicating and controlling conditions such as temperature of a heating medium or unit.

Another object is to provide a selective device whereby a predetermined temperature can be maintained constant at a point remote from said device.

Still another object is to provide a device for controlling temperature of heating plants, units or the like, the device being such that a plurality of adaptations are possible as well as unlimited power control.

Yet another object is to provide a pyrometer which is of continuous operation (on outgoing effect) and adapted for heavy duty switch, valve or the like operation.

A further object is to provide a pyrometer adapted for heavy duty temperature control which is mechanically controlled from the temperature or condition index.

Still further object is to provide a temperature control device operative from a very sensitive movement, yet one which gives continuous power effect and unlimited power.

Yet further object is to provide a device adapted to show and/or control any function which can have its value or characteristic determined.

An additional object is to provide a device for indicating and controlling purposes, the operation of which must be very delicate and sensitive in order to give accurate determination.

Still additional object is to provide a control device for controlling and/or indicating varying or constant conditions, such as temperature, pressure, etc.

Another additional object is to provide a device adapted for control purposes, said device being operated from any or a sensitive movement.

A further additional object is to provide a device of long life and universal application, and one which fulfills all requirements of manufacture and service.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a fragmentary sectional perspective elevation more or less diagrammatic, of a pyrometer which is the subject-matter of this invention, showing the switch control in closed or locked position;

Figure 2 is a perspective showing the adaptation of the device to operating contacts in place of the mercury switch shown in Figure 1;

Figure 3 is a perspective showing the adaptation of the device for valve operation in place of the mercury switch shown in Figure 1;

Figure 4 is a more or less diagrammatic side elevation of the operating mechanism of the pyrometer, showing the switch in open position;

Figure 5 is a more or less diagrammatic side elevation of the operating mechanism of the pyrometer, showing the switch in closed position;

Figure 6 is a more or less diagrammatic side elevation of the operating mechanism of the pyrometer, showing the switch in closed position, the conditions having been changed so that continued operation will trip the switch;

Figure 7 is a more or less diagrammatic side elevation of the operating mechanism of the pyrometer, showing the switch in tripped position;

Figure 8 is a more or less diagrammatic top plan view of the pyrometer mechanism associated with the index, illustrating mechanism whereby the power means associated therewith is automatically rendered inoperative when use of the pyrometer is discontinued;

Figure 9 is a fragmentary side elevation of parts of the pyrometer, showing the same adapted for making a permanent record;

Figure 14 is a diagram showing the pyrometer adapted for heavy duty, the same being used to control an electrical switch connected to the furnace heating unit;

Figure 15 is a diagram showing the pyrometer adapted for heavy duty, the same being used to directly operate valves of a gas furnace;

Figure 16 is a sectional elevation of a modified form of mercury switch, showing the same in closed position;

Figure 17 is a sectional elevation of the mercury switch shown in Figure 16, showing the same in open position;

Figure 18 is an elevation showing the relation of the rocking bar, switch arm and associated parts used when rapid operation of the switch is desired;

Figure 19 is an elevation showing the relation of the rocking bar, switch arm and associated parts used when slow operation of the switch is desired; and Figure 20 is a more or less diagrammatic perspective view of the pyrometer, showing means for indicating the operation of certain of the control devices.

Figure 10:
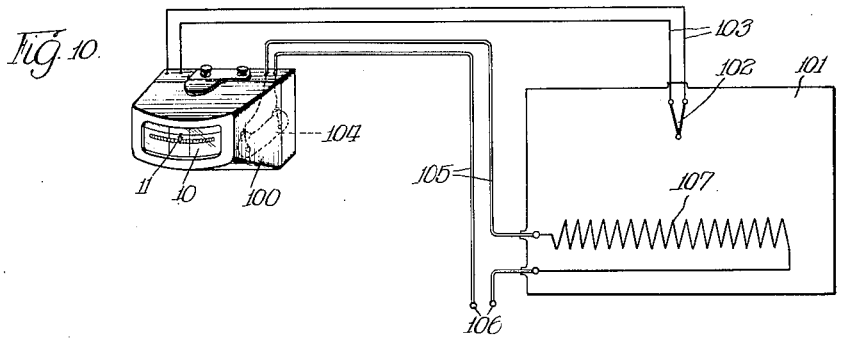
Figure 10 is a diagram showing the pyrometer having a single throw mercury switch which is directly connected in series with the furnace resistors or heating units and the source of supply for the control of said units.

Referring first of all more particularly to Figures 1 to 7 inclusive, it will of course be understood that the pyrometer herein described is suitably housed as indicated in Figures 10 to 15 inclusive, and presents a scale 10 conveniently located and calibrated so that temperature or other conditions to be controlled may be read by reference thereto and to the pointer or index 11. Said pointer or index 11 is preferably movable with respect to said scale and is connected to a galvanometer or millivoltmeter armature 12 mounted for oscillation, the same being connected through suitable conductors to a thermocouple associated with the furnace, heating plant or the like, the pointer 11 being provided with a suitable counterweight 13 to balance the weight of the pointer to eliminate the effect of gravity so that said pointer will operate in any position. A yoke 14 is pivoted for external control through the aperture 15, the pivot being preferably in alignment with the axis of the armature 12, said yoke being provided with depending arms 16 to which a depressor 17 and a holder 18 are pivoted as at 20. The holder may take the form of a supporting arm 19 pivoted to the arm 16 as at 20, said arm 19 being provided with a member 21 adapted to overlie and normally contact the index or pointer 11 to maintain the same in fixed position with reference to the scale 10.

The arm 19 is provided with a pin or member 22 overlying the forwardly extending portion 23 of the depressor, said pin 22 being adapted to be engaged by the portion 23 on the upward movement of said portion to raise the member 21 out of engagement with the index 11. The end of the portion 23 is provided with an angularly disposed index engaging portion 24, the same being so proportioned that it engages the pointer only within small limits, said portion 24 having an extension 25 so arranged as to prevent the depressor from falling off of the index after it is once engaged. The depressor likewise pivoted at 20 is provided with a rearwardly extending arm 26 which is an extension of the arm 23. Said arm is adapted to be contacted by one arm 27 of a bellcrank 28, said bellcrank being pivoted as at 29 and provided with a depending arm 30 having a cam engaging roller 31 pivoted thereto and a selector engaging pin 32 provided on the end of said arm. The roller 31 engages a suitable cam 33 mounted on a shaft 34, said shaft being rotated by a power driven device 35. Said power driven device may take the form of a motor, turbine, Diesel engine, gas engine, clock or any other prime mover, and may be either of the continuous or intermittent type.

The shaft 34 is provided with a crank arm 36 movable therewith, said arm pivotally supporting and operating a link 37 as at 38, said link being provided with a switch operating member 39.

As already explained, the pin 32 mounted on the arm 30 of the bellcrank engages a selector. Said selector takes the form of a rocking bar 40 pivoted as at 41, having an upper pin engaging portion 42 and a lower elongated cam portion 43. Adjacent the cam portion 43, a locking member 44 is pivoted as at 45, the same being substantially of bellcrank shape, having one arm 46 forming a guide member for a portion of the travel of the pin 39, the other arm 47 of the bellcrank extending upwardly and being provided with the shoulder 48 for engagement with corresponding shoulder 49 of the arm 50 of the switch rocking member pivoted along the longitudinal axis of the member 51. Said switch rocking member, as shown in Figure 1, may support a mercury switch 52 having electrodes 53 and 54, contact between said electrodes being established by means of mercury 55. As shown in Figure 2, the mercury switch 52 may be replaced by contacts 56 and 57, the contact 56 being shown mounted on the arm 51, contact 57 being of the fixed type. As shown in Figure 3, the arm 51 may be provided with arm 58 connected through a link 59 to a valve or switch for direct operation of said valve or switch. In any case, the movable switch member or its associated mechanism may be provided with an index 90 extending to the edge of the scale 10 and movable vertically with respect thereto, said scale having markers, such as "On" and "Off" positions indicated thereon, (Figure 20) to indicate the position of the switch and consequently the condition of the furnace resistors or heating units.

At this point it may be well to note that the movement of the cam 33 and the crank arm 36 is so synchronized that the arm 37 is just starting on its upward travel when the roller 31 is in the lowest part of the cam. There may be provided a spring or resilient member 60 so connected to the selector as at its upper end, that the cam portion of said selector always tends to move toward the switch 52. A restricting pin 61 may be provided adjacent the upper end of the selector to limit movement thereof, and similarly a pin 62 may be provided to form a guide for the link 37, a stop for the arm 50 and a stop for the cam portion of the selector.

Referring at this point particularly to Figure 18, it will be seen that an arrangement of the parts is shown whereby a rapid operation of the switch may be effected. In this case, the rocking bar is pivoted as before at 41 and operated by means of the depending arm 30, said rocking bar being formed with a lower cam portion 43. In this figure, the arm 50 of the switch rocking member is pivoted at 51 and is shown in locked position with the locking member 44 shown pivoted at 45. The parts are so proportioned that the arm 50 travels in an arc indicated by the dotted line 50a. Pin 39 carried by the link 37 travels along the cam face 43 of the member 40 to release the locking member 44, and it will be noticed that the pin 39 travels so that the arc 50a of the arm 50 clears the pin 39 as soon as the locking member is released.

With the retarder trip illustrated in Figure 19, the parts are so arranged that the path of movement 50b of the arm 50 is not clear of the path of movement of the pin 39, but the two paths of movement substantially coincide for a short distance, illustrated between the positions of the pin indicated by the numerals 39 and 39a. So it will be seen then that the arm 50 will rest on pin 39 until the position 39a is reached, when it will be free, but the open position of the switch, that is, the lowered position of the arm 50, is such that the pin 39 will not catch on said arm when the pin is being raised.

In the embodiment of the pyrometer illustrated in Figure 8, the power means 35 takes the form of an electric motor, said motor being energized from a source of supply through conductors 63 and 64. The conductor 64 is preferably provided with a switch 65 so arranged that it may be operated to discontinue movement of the motor, said switch being automatically controlled by the pyrometer when said pyrometer is put out of operation. This may be done by simply providing an upstanding member 66 on the movable arm 67 of the switch, said upstanding member being adapted to be contacted by the depressor or associated mechanism when the same is moved to indicate that the pyrometer is inoperative. In a similar manner, any power unit may be controlled.

The operating parts of the pyrometer recording and controlling device illustrated in Figure 9 are substantially the same as those already described, with the exception that additional members are supplied either supplementing or replacing the scale 10 and index 11, it being understood of course that the operation of the pyrometers are substantially the same. In this case, drums 68 may be mounted directly under the member 21 of the holder 18, the axis 69 of the drums preferably being in a vertical plane through said member 21, the drums being actuated by any power driven means to revolve at a certain rate in order to provide readings of the conditions to be controlled at such rate. Adjacent the drums 68, there is preferably provided a roll of recording paper or charts 70 so disposed that the charts 71 are fed to the drums 68 and moved thereby by any means at the rate of movement of the drum. The drums 68 may be made in the form of a pair of chart operating members located at either end of a knife edge 72 over which the charts are moved. A marking medium 73 is provided between the chart 71 and the pointer 11 for the purpose of permitting an impression to be made, such impression being made on the charts by oscillation of the depressor and holder, movement of the members serving to depress the index 11 to make the impression through the inking medium 73.

Referring now to Figure 10, the pyrometer 100 is shown directly connected to operate the heating unit 101, operation of the pyrometer per se to be more particularly described. In this case, the thermocouple 102 is connected through conductors 103 to operate the pointer 11 through actuation of the galvanometer or millivoltmeter armature (not shown), readings being made on the scale 10. In this case, the mercury switch 104 is directly connected in series through conductors 105 to the source of supply 106 and the resistors or heating units 107, so that opening or closing of the switch 104 deenergizes or energizes the resistor to produce a certain heat, said heat acting on the thermocouple 102 to actuate the pyrometer to control the heat conditions in the heating unit 101.

Figure 11:
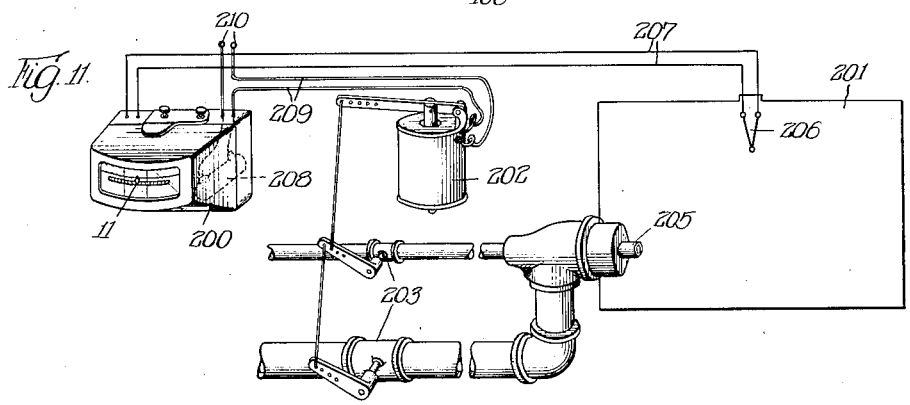
Figure 11 is a diagram showing the pyrometer adapted for solenoid control, the solenoid serving to operate the valves of a gas operated furnace.

Referring now to Figure 11, the pyrometer 200 is adapted to control the gas or oil furnace or unit 201 through the solenoid 202, said solenoid being connected to fluid valves 203, the same controlling the mixture of fluid to the burner or injector 205. As before, the thermocouple 206 is connected through conductors 207 to actuate the pointer 11 in a manner as already described. In this case, the mercury switch 208 is connected in series through the conductors 209 with a source of supply 210 of the solenoid. In this case, with the pyrometer described, the relay between the pyrometer and the solenoid may be eliminated as it is possible to use a large enough switch 208 to operate the solenoid directly, opening and closing of the switch 208 serving to deenergize or energize the solenoid 202 to open or close the valves 203 and 204.

Figure 12:
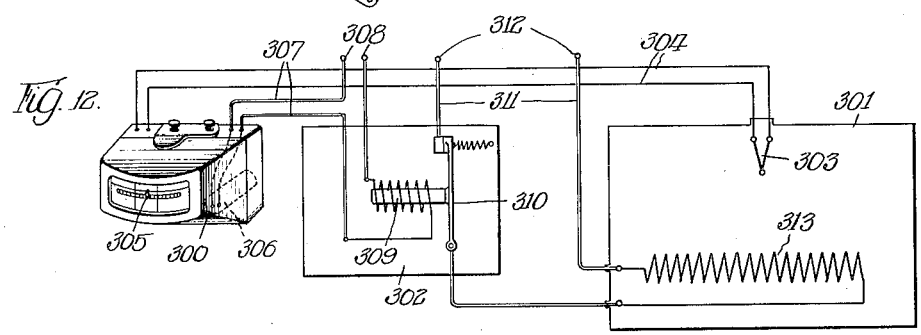
Figure 12 is a diagram showing the pyrometer control of a simple relay which in turn controls the furnace resistors.

Referring now to Figure 12, the pyrometer 300 is adapted to operate the electric unit or furnace 301 through a simple relay 302, which relay may be of any size or power. As before, the thermocouple 303 is connected through suitable conductors 304 to the pyrometer or actuation of the index 305. In this case, the mercury switch 306 is connected in series through suitable conductors 307 with a source of supply 308 and the solenoid 309 of the relay 302, the solenoid serving to actuate switch arm or armature 310 connected in series through conductors 311 with a source of supply 312 and the resistors or heating units 313. In this case, under conditions controlled by the pointer, closing or opening the switch 306 serves to energize or deenergize the solenoid 309, in turn actuating the armature 310 to energize or deenergize the resistors 313, the same being done automatically to maintain the heating unit 301 at a constant temperature.

Figure 13:
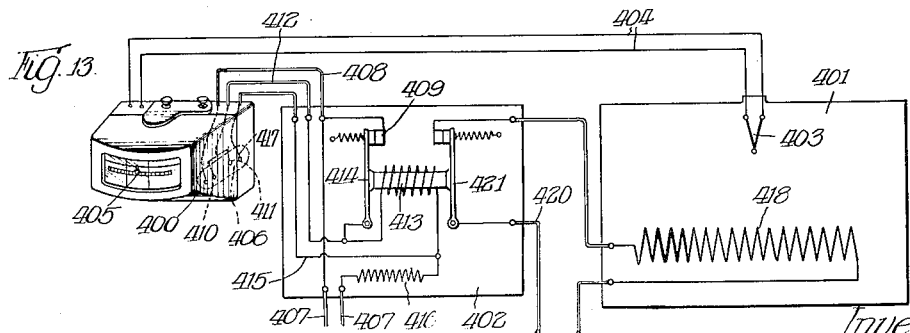
Figure 13 is a diagram showing the pyrometer control of a standard locking in relay which in turn controls the furnace resistors.

Referring now to Figure 13, the pyrometer 400 is adapted for control of the electric furnace or unit 401 through the locking in relay 402. As before, the thermocouple 403 is connected to the pyrometer through the conductors 404 for condition indication by index 405, the mercury switch 406 being of such character that it is connected at its closed end to one side of a source of current supply 407 through the conductor 408, said conductor being connected to one contact 409 of the relay. Switch points 410 and 411 on the closed and open side of the switch are connected through conductor 412 with the solenoid 413, normally opened armature 414, conductor 415, and the other side of the source of supply 407 through the resistance 416, the conductor 415 being connected to the electrode 417 on the open side of the switch and to conductor 412 between the solenoid and resistance. The resistor or heating unit 418 is connected to the source of supply 419 through conductors 420 controlled by the normally opened armature 421 of the relay. It will be seen that when the mercury switch 406 is closed, current is supplied from one side of the source 407 through conductor 408, through the mercury switch to the conductor 412 to the solenoid 413, energizing said solenoid, through resistance 416 to the other side of the source 407. Energization of the solenoid 413 serves to actuate the armatures 414 and 421 to permit energization of the resistor 418 through the armature 421 and conductors 420. When the mercury switch 406 is operated to open position, the relay is opened by the short circuit, in that current is supplied from source 407 through conductor 408, contact 409, armature 414, conductor 412 through the mercury switch to conductor 415, through the resistance 416 and back to the source of supply 407, causing deenergization of the solenoid 413, permitting opening of the armature 421, interrupting the current supply from the source 419 to the resistor 418, all in a well known manner. The armature 414 then opens and both armatures are not closed until energization of the solenoid as described above. If greater power than that given by the relay is needed, the relay shown can be made to operate a current relay similar to that shown in Figure 12, in which case unlimited power can be controlled.

Referring now to Figure 14, the pyrometer 500 in this case is adapted for heavy duty in that operation may be effected by means of a motor and reduction gear train 501. As before, the electric furnace 502 is provided with a suitable thermocouple 503 connected through the conductors 504 with the pyrometer for indication of temperature conditions by means of the pointer or index 11 and scale 10. In this case, the member 50 (Figure 1) is provided with a shaft 505 connected to or a prolongation of the member 51, the shaft being provided with a crank arm 506 connected through the link 507 with one arm of a bellcrank 508 of the snap switch 509, the other arm 510 of the bellcrank being connected through resilient connection 511 with crank 512, operating the switch members or arms 513. The operation of the switch 509 with the toggle joint and spring arrangement gives a quick opening movement to the switch while the lever 506 may move slowly. In this way, high power and high voltage may be handled since any kind of a contactor device may be used, the same being placed in series between the source of supply 514 and the resistor 515 of the furnace, suitable conductors 516 being used. In operation then, actuation of the shaft 505 by the pyrometer serves to open and close the switch arms 513, disconnecting or connecting the source of supply 514 with the resistor 515.

Referring now to Figure 15, as before the pyrometer 600 is adapted for heavy duty work, employing the motor and reduction gear train 601. The gas or oil furnace 602 is provided with a suitable thermocouple 603 connected to the pyrometer through the conductors 604. The furnace is of the same nature as that already described in Figure 11, employing the fluid valves 605 and 606 for controlling the flow of fluid to the injector 607. In this case, the shaft 608 is provided with the crank 609 having a link 610 operating the valves 605 and 606 through crank and links 611 and 612.

Referring again to Figures 1 to 9 inclusive, the actuation of the pyrometer per se for controlling various systems such as described above is as follows: As already pointed out, the thermocouple is connected through suitable conductors to operate the armature 12, which in turn operates the pointer 11, it being understood of course that when the holder member 21 is in contact with the pointer 11, said pointer cannot be moved but when the holder member 21 is raised from the pointer, said pointer is free to be moved by the armature, said movement depending upon the conditions of the furnace or unit to be controlled.

Assuming that the power unit 35 is of continuous operation, it will be noticed that said unit is connected through suitable gearing with the shaft 34, rotating same at a predetermined rate, rotation of this shaft causing rotation of the cam 33, in turn actuating the bell crank 28 to move the arm 27 to move the depressor 17, movement of the depressor 17 serving to raise and lower the holder member 21 out of and into engagement with the pointer 11. With the parts in the position as illustrated in Figure 4, it will be seen that the mercury switch 52 is in open position with no current being supplied to the resistors of the furnace. This mercury switch as well as any other used, may be of the slow or quick open type, depending on conditions desired, as for instance, for comparatively large currents such as twenty-five amperes or over, a slow operating switch being advantageous would be employed. When the pointer reads below the desired temperature rotation of the cam 33 in a clockwise direction serves to raise the member 50 to close the mercury switch 52, as illustrated in Figure 5, and when the switch is in closed position, the bellcrank or locking member 44 moves to engage the member 50 to lock the switch in its closed position. During this movement, the cam 33 has revolved through substantially 180°, raising the depressor arm 17, in turn raising the holder which frees the index 11, and should the conditions in the furnace be such that the desired temperature is attained, the pointer 11 will be moved to the position illustrated in Figure 6, where it will intercept the further movement of the depressor 17, in which case continued movement of the shaft 34 and the cam 33 through substantially 180° lowers the link 37 to a position below the selector 40, but the depressor having contacted the index 11, the upper end of the selector is not contacted by the pin 32, in which case the spring 60 keeps the lower cam portion of the selector toward the left to contact with pin 62. A continued movement of the shaft 34 through substantially 180°, as illustrated in Figure 7, guides the pin 39 of link 37 to the right of the selector cam portion, as illustrated in Figure 6, continued movement of the link 37 serving to move the locking arm 47 out of contact with the arm 50, permitting the arm 50 to lower to open the mercury switch, cutting off current to the resistor of the furnace. The switch thus remains open as long as the temperature is at the point desired.

It will be understood of course that continued movement through 180° will return the mechanism to the position illustrated in Figure 4, that is, the shaft 34 will revolve the cam through substantially 180°, the pin 39 will free itself from the position between the selector and the locking member, pin 32 will engage the upper portion of the selector, moving the same so that there is substantially no gap between the guide portion 46 and the selector, so that further movement of the shaft 34 will direct the pin to the left of the selector, as illustrated in Figure 5, the sequence of operations being continued as described. It will of course be understood that such operation may not occur every revolution, as the temperature of the furnace may be such that the pointer 11 will not intercept the depressor, in which case the switch 52 once closed will not be affected.

It is sometimes necessary or desirable to use a different form of mercury switch than that illustrated in Figures 1 and 4 to 7 inclusive, especially where high powers are being handled, in which case the mercury switch includes a preferably transparent tube 800 provided at opposite ends with contacts 801 and 802, the same being connected to leads 803 and 804 respectively. The tube 800 is provided on the inside thereof with an open ended tube 805 preferably made of quartz and provided with a contracted end 806 adjacent the lower terminal 801. The tube is spaced and maintained in spaced relation with respect to the tube 800 by means of spacers 807. In this case, the mercury 808 is used as the means of establishing contact between the contacts 801 and 802, though it will be understood that any other suitable fluid may be used. In such a switch, the mercury always covers the contacts 801 and 802, such as clearly shown in Figures 16 and 17, Figure 16 showing the position of the tube when the contacts are in electrical connection. When the switch is moved to a position shown in Figure 17 to break electrical connection between the contacts, a portion of the mercury flows toward the lowered end, causing a break or disconnection in the mercury itself adjacent the point 809 in the quartz tube so that the heat of the arc is expended on the quartz surface and is dissipated through a large volume of the mercury to thereby prevent excess heating of the terminals or contacts where they pass through the glass to thereby prevent rupture of the tube. In this manner, the mercury switch can control power which is increased many times over that of the standard mercury tube employing the breaks in the connections at the contacts.

In the adaptation of the device to the permanent record device illustrated in Figure 9, it is of course understood that actuation of the depressor and consequently the holder, causes the holder to periodically contact the index 11, creating a permanent impression on the index or chart sheet 71 through the inking medium 73, the operation of said chart sheet being of course regulated for a predetermined actuation, the furnace current control mechanism of course being substantially the same.

It is to be understood that I do not wish to be limited by the exact embodiments of the device shown, which are merely by way of illustration and not limitation, as various and other forms of the device will of course be apparent to those skilled in the art without departure from the spirit of the invention or the scope of the claims.

I claim:

1. In an electrical instrument, the combination of an index, a single depressor pivoted for oscillatory movement with respect thereto, movement of said depressor being adapted to be limited by said index, operating means for imparting movement to said depressor, control means adapted to occupy one of two positions, means associated with said operating means for operating said control means, and guide means controlling movement of said third named means for actuating said control means to one or the other positions in accordance with the position of said index.

2. In a control device, the combination of an index, a single member movable with respect thereto and adapted to be limited in movement thereby, a guide whose position is controlled by said member, control means operable to one of two positions, means for moving said first named member and control means, movement of said control means to one or the other of said positions being controlled by movement of said guide in accordance with the position of said index.

3. In a control device, the combination of an index movable under varying conditions of operation, a single member associated therewith and pivotally and movably mounted with respect thereto, movement of said member being controlled thereby, guide means controlled by said member, control means operable between two positions, means for moving said first named member and control means, movement of said control means to one or the other of said positions being selectively controlled by said guide means in accordance with the conditions of operation.

4. In a control device, the combination of an index movable under varying conditions of operation of the means to be controlled, a single member associated therewith and pivotally mounted with respect thereto, movement of said member being controlled thereby, power driven control means operable between two positions, operating means, and means associated with said operating means and said first named member to operate the control means to one or the other of said positions in relation to the varying conditions of operation of the means to be controlled.

5. In a control device, the combination of an index movable to indicate conditions to be controlled, a single pivotally mounted member associated therewith and restricted thereby, a power driven member for imparting movement to said pivotally mounted member, a movable control means operable to one of two positions, means associated with said first named member for controlling movement of said control means, and means continuously actuated by said power driven member and controlled by said second named means for actuating said control means to one or the other positions according to said conditions to be controlled.

6. In a control device, the combination of an index sensitive to and in operative relation to conditions such as temperature, pressure, etc. to be controlled, a pivoted member oscillatably mounted to be intercepted by said index in certain positions thereof, a power driven member for oscillating said pivoted member, a reciprocating member driven by said power driven member, control means operable between two positions, and means including a selecting member and a locking member for operating said control means to one or the other of its positions in accordance with the position of said index.

7. In a control device, the combination of an index sensitive to and in operative relation to conditions such as temperature, pressure, etc., to be controlled, a pivoted member oscillatably mounted to be intercepted by said index in certain positions thereof, a power driven member for oscillating said pivoted member, a reciprocating member driven by said power driven member, control means, and means including a selecting member and a locking member for operating said control means, said selecting member being operatively associated with said pivoted member and said locking member cooperating with said control means and operative by said reciprocating member.

8. In a control device, the combination of an index sensitive to and in operative relation to conditions such as temperature, pressure, etc., to be controlled, a pivoted member oscillatably mounted to be intercepted by said index in certain positions thereof, a power driven member for oscillating said pivoted member, a reciprocating member driven by said power driven member, control means, and means including a selecting member and a locking member for operating said control means, said selecting member being operatively associated with said pivoted member and said locking member cooperating with said control means and operative by said reciprocating member, said reciprocating member being selectively directed to operate said locking member by said selecting member.

9. The combination with a responsive device including a movable needle, of a depressor, a regulatable apparatus subject to variation which causes movement of said needle relative to said depressor, said depressor biased to dip into the path of said needle, a prime mover repeatedly moving said depressor out of said path and allowing it to move back into said path and solely mechanical regulating mechanism for said apparatus controlled one way by said depressor as the latter dips into said path and controlled the other way when said depressor is limited in its movement by engagement with said needle whereby said regulating mechanism is only operated when movement of said depressor is varied by said needle.

10. A control system comprising a galvanometer having a movable needle, a regulating device, a prime mover normally disconnected therefrom but capable of causing a full operation of said regulating device, and a depressor moved by said prime mover into the path of said needle and having means operative at such movement to render said prime mover effective to cause a full operation of said regulating device and operative when the depressor is intercepted by contact with said member to render said prime mover effective to cause a reverse operation of said regulating device.

11. The combination of a prime mover, a regulating device, means between said elements caused to reciprocate along one of two paths by said prime mover and capable during its stroke along one path of operating said regulator one way and of operating said regulator in the opposite way during its stroke along the other path, and a depressor-and-indicator mechanism to control said means and including a depressor caused by said prime mover to dip into and out of the path of the movable indicator, and having means effective at such dipping movement to select a path for the means and for selecting the other path for the means when the depressor is intercepted by the indicator for effecting alternative movement of the regulating device.

12. The combination of a movable index, a regulating device, a prime mover normally disconnected therefrom but capable of causing full operation of said device and a depressor moved by said prime mover into and out of the path of said index and operative at the co-operation of said index and said depressor, to cause a full operation of the device and operative upon non-co-operation of the index and the depressor, to cause a reverse operation of the device.

13. The combination with a movable indicator, of a prime mover, a train of mechanism ramifying from said prime mover and terminating in an oscillating member movable into and out of the path of the indicator, said mechanism including a part reciprocable along one of two paths, and selective means for enabling the indicator upon co-action with the member to select one or the other of said paths for said part whereby to shift a regulating device to an alternative position.

14. The combination with a movable indicator, of a prime mover, a member movable across the path of the indicator, a regulating device, and solely mechanical means positionable by movement of the member across said path and operable by the prime mover to operate the regulating device one way and operable when the member is intercepted or arrested by the indicator, to shift the regulating device to an alternative position.

15. A control system comprising a device having a movable indicating needle, a depressor, a holder for temporarily holding the needle against movement, a rotating cam, means operable by said cam for causing said holder to engage and hold said needle and cause said depressor to beat across the path of the needle and a regulator controlled by said depressor and operated one way upon arrest of the depressor by the needle and operation reversed when the depressor beats freely across the path of said needle.

16. A control system comprising a device having a movable pointer, a depressor movable back and forth across the path of the pointer, a member, a prime moving device to cause said member to oscillate said depressor, a reciprocable element associated with said prime moving device and operable thereby, means whereby the path of the reciprocable element may be varied upon arrest or contact of the depressor by the pointer and regulating means operable by said element when its path is varied by the depressor.

17. A control system including an instrument provided with a movable needle, a rotating device, a reciprocable member driven thereby and reciprocable along a plurality of paths, a regulating apparatus operable to one position when said member travels one path and operable to an alternative position when it travels another path, means including a depressor movable across the path of the needle and operable when the depressor is intercepted by said needle to cause said member to travel one path and when it is not intercepted to cause said member to travel another path.

18. A control system including a device provided with a movable index, a prime mover, a reciprocable member driven thereby and travelable along one of a plurality of paths, a regulator operable to alternative positions depending upon the path taken by said member, a depressor also operable by said prime mover to dip into and out of the path of the index and means operable by said depressor for alternatively selecting the path for said member upon arrest or non-arrest of said depressor by said needle.

19. A control system comprising a device having a movable index, a pivoted depressor for dipping into and out of the path of the index, a prime moving device including a rotating shaft, a cam having a dwell therein and rotated by said shaft, a bell-crank having an arm cooperating with said depressor and another arm co-operating with said cam whereby as said latter arm rides into the dwell the depressor dips into the path of the index and moves out of said path as the arm rides out of said dwell, a selector movable to one position by said bell-crank as the arm thereof traverses the dwell and to another position as the arm rides over the other part of the cam, a reciprocable element also driven by said shaft and controlled by said selector, and a regulating device controlled by said element.

20. The combination of a movable indicator, a pivoted depressor, means for causing said depressor to dip into the path of the indicator, a pivoted holder for holding said indicator stationary as the depressor dips into the path of the latter, said depressor and holder being adjustable along the path of the indicator, to determine the point in the movement of the indicator at which the regulation shall be effected.

21. The combination with a device having a pivoted indicator, of a support for the point of said indicator, a holder for pressing said indicator against the support to temporarily hold the same against movement, means for causing said holder to hold said indicator in its then position and causing said depressor to beat into the path of the indicator, a common support for said holder and depressor and pivoted for adjustment about the pivot of the indicator.

22. The combination with a device having a movable indicator and a scale with which the indicator co-operates, the scale serving as a support for the indicator, of a holder for periodically pressing the indicator against the support, a member, means for causing said member to beat across the path of the indicator and for causing the holder to depress the indicator against its support as the member beats into the path thereof, and controlling mechanism called into action by the arrest of the member by the indicator.

23. The combination of a furnace, a thermocouple therein, a galvanometer connected to the thermocouple, a prime moving depressor mechanism including a single depressor caused to dip into and out of the path of the needle of the galvanometer and a mercury switch shiftable to one position upon contact or arrest of the depressor by the needle and to an alternative position when the depressor dips into the path of the needle for regulating the temperature of the furnace.

24. The combination of a furnace, a pyrometer subject to the temperature of the furnace and having a movable indicator, a prime moving depressor mechanism including a single depressor caused to dip into and out of the path of the needle and a normally open mercury switch shiftable to closed position when the depressor dips into the path of the indicator and shiftable to open position upon contact of the depressor with the indicator to regulate the temperature of the furnace to a predetermined point.

25. A control system comprising a device having a movable indicator, a depressor caused to beat across the path of the indicator, a normally open control mechanism, and solely mechanical means operable by the depressor when it beats across the path of the indicator to close the control mechanism and operable when the depressor is intercepted by said indicator to open said mechanism.

26. A control system comprising a galvanometer having a movable index, a depressor, a prime mover for causing said depressor to beat across the path of the index, a switching mechanism normally restrained to open position, a latch for holding said mechanism in closed position, and means operable by the depressor when it beats across the path of the index for moving said mechanism to closed position and operable when the depressor is intercepted or arrested by said index, for releasing said latch, to permit said mechanism to return to open position.

27. A control apparatus comprising a device having a movable needle, a prime mover, a depressor and a reciprocating member driven by said prime mover and the depressor dipping into and out of the path of the needle, a controlling mechanism normally restrained to one position, means for holding said mechanism in another position after it has been moved to that position, a selector for the reciprocating member and means operable by the depressor as it moves into the path of the needle for moving the selector to cause the reciprocating member to move the control mechanism to its other position and operable when the depressor is prevented from dipping into the path of the needle by contact therewith, for moving the selector to cause said member to release the holding means so that said mechanism can return to its normal position.

28. A temperature regulating apparatus including a heat sensitive device having a movable index, a depressor, means for causing said depressor to dip into the path of the index, a tiltable switch biased to one position, a latch for holding said switch in its other position, a reciprocating member operated by said means, a guide for said reciprocating member and means operated by the depressor, when it dips into the path of the index, for operating said guide to cause the member to move the switch to its other position and for operating said guide, when the depressor is intercepted by the index, to cause the member to release the latch whereupon the switch returns to normal position.

29. A control system including a device having a needle sensitive to the condition to be regulated, a mercury switch mechanism adapted to normally occupy an open position, a latch for retaining said switch in closed position when it is moved to that position, a pivoted depressor biased to dip into the path of the needle, a rotatable shaft, a cam carried thereby and having a dwell therein, a pivoted lever having one end co-operating with the depressor and its other end bearing upon the cam, a reciprocating member connected to said shaft and reciprocated thereby, a guide or selector for said member and operable by said lever, whereby upon rotation of the shaft the lever, in traversing the dwell in the cam, causes the depressor to dip into and out of the path of the needle and also causes the selector to move the guide so that the member closes the switch mechanism where it is retained by the latch, but when the depressor is intercepted by the needle and thereby prevented from dipping into the path thereof the lever is inhibited from riding into the dwell of the cam and the guide is positioned to cause the reciprocating member to release the latch whereupon the switch returns to normal position.

30. The combination of a movable index, a prime mover, a device normally disconnected from but adapted to be operated by said prime mover, a depressor adapted to be moved into and out of the path of said index by said prime mover, the co-action or non-co-action of said depressor and said index determining the effectiveness of the co-operation of said prime mover and said device to be operated.

31. The combination with a movable index, of a member dipping into and out of the path of the index, a regulating device operable between two positions, a prime mover for operating said device, and means operable upon co-action or non-co-action of the member and index for establishing co-operative relationship between said prime mover and device whereby the latter is operated to one or the other of said positions by the prime mover.

32. In a device for regulating remote conditions of temperature, power or the like, the combination of a switch for controlling operation of said remote conditions, a power device for operating said switch, connections between said power device and switch for effecting operation of the latter, means operated by said power device for preventing connection of said connections, means for indicating said remote conditions, and means operated by said last named means for controlling said first named means whereby said connections are connected or prevented from connecting.

33. In a device for regulating remote conditions of temperature, power or the like, the combination of a switch for controlling operation of said remote conditions, a constantly operating power device for operating said switch, connections between said power device and a switch for effecting operation of the latter, means operated by said power device for preventing connections of said connections, means for indicating said remote conditions, and means operated by said last named means for controlling said first named means whereby said connections are connected or prevented from connecting.

34. In a device for regulating remote conditions of temperature, power or the like, the combination of a switch for controlling operation of said remote conditions, a latch member for maintaining said switch in at least one position of operation, a constantly operating power device for operating said latch member, connections between said power device and latch member for effecting operation of the latter, means operated by said power device for preventing connection of said connections, means for indicating said remote conditions, and means operated by said last named means for controlling said first named means whereby the positions of said latch member and switch are controlled.

35. In a device for regulating remote conditions of temperature, power or the like, the combination of a switch for controlling operation of said remote conditions, a latch member for maintaining said switch in at least one position of operation, a constantly operating power device for operating said latch member, connections between said power device and latch member for effecting operation of the latter, said connections including a reciprocating member for operating said switch, means operated by said power device for preventing connection of said connections, said means including a cam member for controlling operation of said reciprocating member and switch, means for indicating said remote conditions, and means operated by said last named means for operating said cam member whereby movement of said reciprocating member is controlled for operating said switch.

36. A control system including a responsive device provided with a movable index, a guide, means controlled by said index for positioning said guide, a movable member adapted to traverse a path on one or the other side of the guide according to the position of said guide, and control means selectively operated by said member according to the path traversed by said member.

37. A control system including a responsive device having a movable needle, a depressor caused to dip into the path of the needle and adapted to have its movement limited by contact with the needle in certain positions thereof, a mercury switch operable to a plurality of positions, and means controlled by said depressor for operating said switch, said means operating said switch only when movement of the depressor is varied by said needle.

38. In a control system, a pointer movable in two fields, each of these fields defining a stage of control, mercury switch means for effecting said stages of control, a train of mechanism including a single depressor controlled by said pointer for positioning said switch, said mechanism adapted to operate said switch only when the pointer passes from one to the other of said fields.

39. A control system for an electric heating unit comprising a pointer movable in two temperature zones one of which is below the predetermined control point, mechanical means including a single member coacting with said pointer and a mercury switch in series with said heating unit and operated to a closed position by said means whenever said pointer enters the temperature zone below said control point and remaining closed until said pointer enters the temperature zone above said control point.

40. In a control system, a pointer movable in two fields, one of said fields representing a need for increasing mode of control, the other field representing a need of decreasing mode of control, mechanism including a member periodically contacting said pointer and mercury switch means including a latch for retaining said switch in one of its positions, said switch adapted to be closed by said mechanism whenever said pointer enters the field of increasing control and remaining closed until said pointer enters the field of decreasing control.

41. In a control system, a pointer movable in only two fields, each of which fields define a stage of control, a train of mechanism including a single member coacting with said pointer when it is in one of said fields and a switch operable by said mechanism, so as to remain continually in one position while the pointer is in one of said fields and to remain in another position continually while the pointer is in the other of said fields.

42. The combination of a movable indicator, a member caused to beat into and out of the path of said indicator, a mercury switch adapted to be retained in either of two positions, and means whereby the position in which said switch is retained is determined by coaction and non-coaction of said indicator and said member for controlling the functioning of an apparatus whose operation is shown by said indicator.

43. A control device having in combination, a responsive device, provided with a movable index, a guide, means controlled by said index for positioning said guide, an actuator to traverse a path on one or the other side of the guide according to the position of said guide, a pivotally supported mercury switch biased to one position and means for maintaining said switch in another position, said switch operated to said one position by the actuator when it traverses one path and to the said other position when it traverses the other path.

44. A control system having in combination, a responsive device provided with a movable index, a guide, means controlled by said index for positioning said guide, an actuator to traverse a path on one or the other side of the guide according to the position of said guide, and a shiftable mounted mercury switch biased to one position, a latch for maintaining said switch in another position, said actuator operating said switch to latched position as it traverses one path and unlatching said latch when traversing the other path permitting said switch to move to biased position.

45. A control device having in combination an index deflectable in a plane, a pivoted member movable transversely of said plane and having predetermined movements depending upon the position of the index, means for actuating said member, a mercury switch, and means selectively controlled by said member for causing said switch to assume and/or retain one position when one of said predetermined movements of the member is effected and for causing said switch to assume and/or retain another position when another of said predetermined movements of the member is effected.

46. A control device having in combination an index deflectable in a plane, a pivoted member movable transversely of said plane and having predetermined movements depending upon the position of the index, a mercury switch shiftable between normal and latched position, means for actuating said member and switch, a latch for holding said switch in latched position and means selectively controlled by said member for causing said actuating means to operate said switch to latched position when one of said predetermined movements of the member is effected and for unlatching said latch to permit the switch to assume its normal position when another of said predetermined movements of the member is effected.

47. A control system including a responsive device having a movable needle, a prime moving mechanism including a depressor dipping into and out of the path of the needle, a switch including contacts, fluid for establishing electrical connection between said contacts and switch operating means controlled by said mechanism whereby said switch is shifted to and retained in one position upon arrest of the depressor by the needle and shifted to and retained in an alternative position when the depressor dips into the path of the needle.

Signed at Chicago, Illinois, this 2nd day of May, 1928.

ALBERT F. SPITZGLASS.